Sept. 26, 1961 T. L. FAWICK 3,001,623
CENTRIFUGAL CLUTCH
Filed Dec. 23, 1958

INVENTOR.
THOMAS L. FAWICK
BY Willard D. Eakin
ATTORNEY

3,001,623
Patented Sept. 26, 1961

1

3,001,623
CENTRIFUGAL CLUTCH
Thomas L. Fawick, Cleveland, Ohio, assignor to Fawick Corporation, a corporation of Michigan
Filed Dec. 23, 1958, Ser. No. 782,480
3 Claims. (Cl. 192—105)

This invention relates to centrifugal clutches of the type in which a set of circumferentially spaced balls or the like are urged outward by centrifugal force and thus wedge apart a pair of clutch elements for clutch engagement.

Its chief objects are to provide a simple and highly compact clutch assembly; to provide a clutch in which the balls or the like are driven circumferentially by frictionally driven means, for avoidance of excessively sudden engagement of the clutch; to provide for adjustment of the said frictionally driven means, for varying the time allowed for full engagement of the clutch; to provide in an improved manner for distribution of the wear that is incident to the functioning of the balls or the like; to avoid an excessive amount of wear in the centrifugal mechanism; to provide a centrifugal mechanism especially well adapted for a multiple-disc or heavy duty clutch; to provide a clutch having the centrifugal mechanism well enclosed by clutch elements free of dangerous projections or crevices; to provide a clutch having relatively light driving elements, for low inertia load; and thus and in other respects to provide a clutch especially well adapted for mounting on the motor shaft of a constant speed electric motor.

Figure 1:
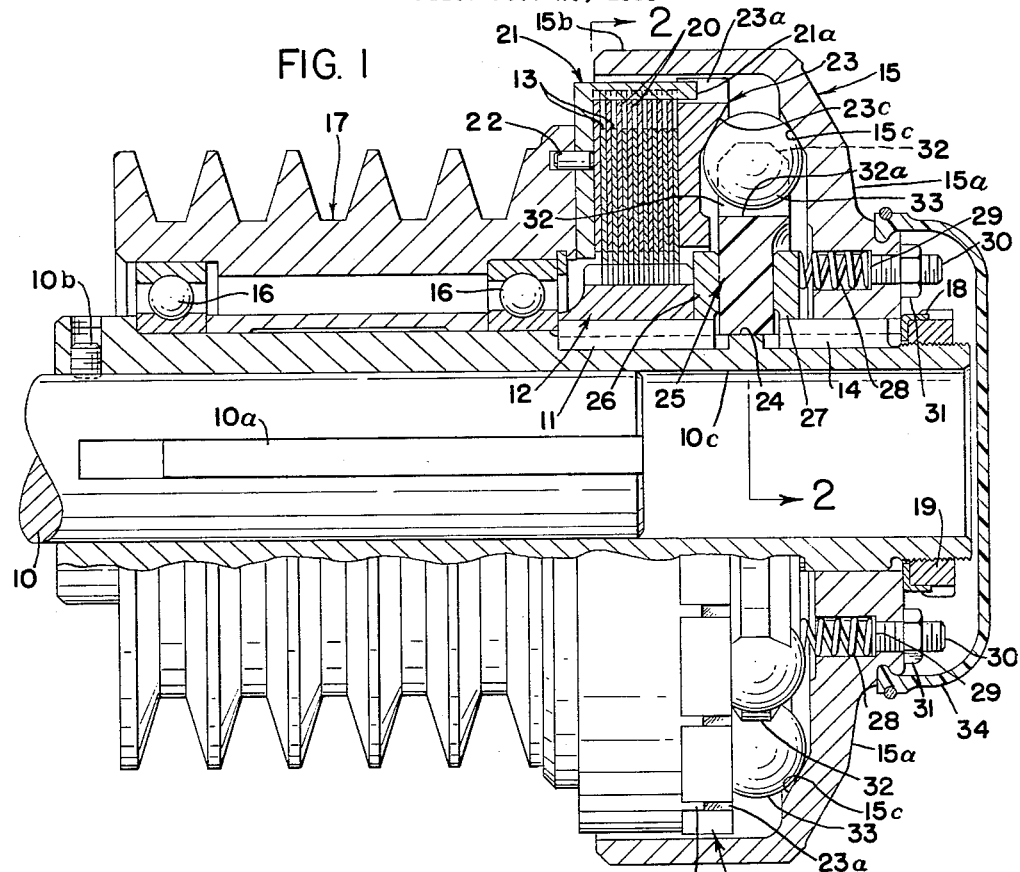
FIG. 1 is an axial section of a clutch assembly embodying my invention in its preferred form for a multiple-disc or heavy duty clutch.
Figure 2:
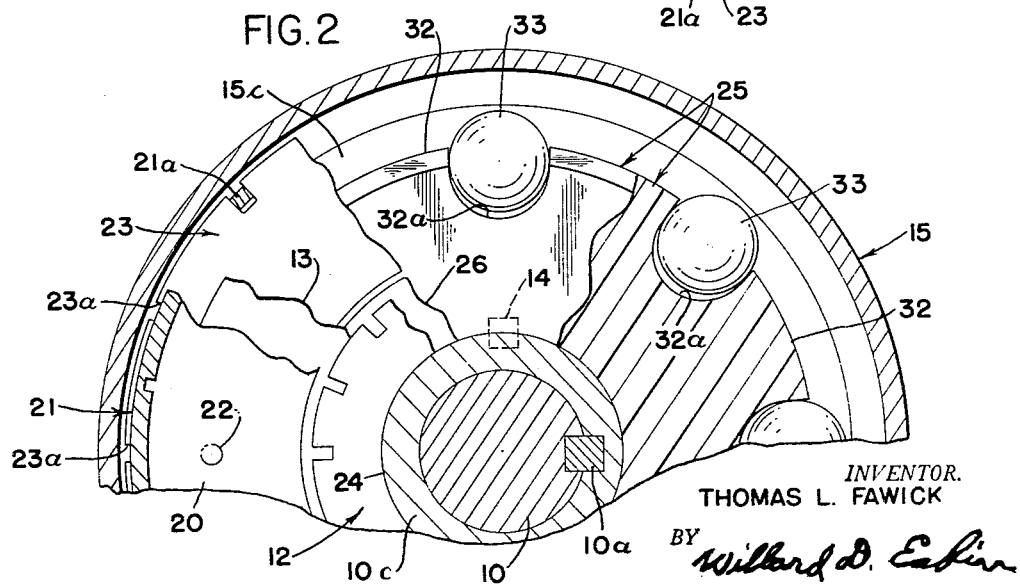
FIG. 2 is a section on line 2—2 of FIG. 1.

The driving shaft 10 has secured upon it by a key 10a and a set-screw 10b an extension sleeve 10c. Mounted upon the said sleeve and secured against relative rotation by a key 11 is a driving clutch-hub 12 having the driving set of clutch-discs 13, 13 splined upon it. Also mounted upon the driving shaft 10 and secured against relative rotation thereon by a key 14 is a bell-shaped member 15 having a cam-disc portion 15a and a plate-housing portion 15b.

The driving clutch-hub 12 is held against leftward movement by contact with the inner race of the adjacent one of ball-bearings 16, 16 by which the driven member 17, here shown as a multiple-V-belt pulley, is journaled upon the driving shaft 10. The cam-disc member 15 is secured against rightward movement by a lock-washer 18 and a nut 19 on the extension sleeve 10c.

The driven clutch-discs, 20, 20, are splined in a bell-shaped member 21 which is doweled, as at 22, 22, to the adjacent end of the driven pulley 17.

A presser plate 23 is slidably mounted in and centered by the bell portion of the driven element 21 and interlocked therewith against relative rotation by interengaged but axially slidable jaws 21a, 23a.

The extension sleeve 10c, between its keyways in which the keys 11 and 14 are mounted, is formed with a full-diameter annular zone 24, upon which is slidably and rotatably mounted a ball-impelling ring 25, preferably made of a self-lubricating or inherently slippery and wear-resistant material such as nylon.

For frictionally driving the ball-impelling ring 25 a friction ring 26 is keyed upon the sleeve 10c along with the drive-hub 12, between the latter and the adjacent plane side face of the nylon ring 25, and a friction ring 27 is keyed upon the sleeve along with the driving cam-disc member 15, between the latter and the adjacent plane side face of the nylon ring.

2

For pressing the group of rings 27, 25, 26 to the left, against the stop provided by the driving hub 12, a set of circumferentially spaced compression springs 28, 28 are mounted in respective sockets formed in the member 15 and bear against the adjacent side face of the friction ring 27. In each of the sockets is slidably mounted a spring-seat disc 29 and bearing against it is an adjusting screw 30 threaded through the end-wall of the spring-socket and provided, outside of the member 15, with a nut 31 for holding the screw in adjusted position. The adjusting screws 30 are provided for the purpose of selectively adjusting the forces which the respective springs 28 exert against the friction ring 27. By virtue of this arrangement, the initial friction between the discs 26 and 27 and the ball-impelling ring 25 may be selectively varied so as to vary accordingly the time required for full engagement of the clutch.

The outer periphery of the nylon ring 25 is formed with a set of circumferentially spaced sockets, defined by intervening ball-impelling fingers 32, 32, the sockets being occupied respectively by centrifugal balls 33, 33, adapted to be moved outwardly by centrifugal force and thus to contact and wedge apart outwardly converging annular cam faces 23c, 15c on the driven member 23 and the driving member 15 respectively.

Preferably the floors 32a, 32a of the ball sockets and the ball-contacting faces of the fingers 32 are rectilinear in the axial direction, to permit the balls to have free axial rolling movement thereon and thus to find their proper positions as determined by the cam faces 23c, 15c in spite of such wear as may occur between the nlyon ring 25 and its backing ring 26 and such wear as may occur among the multiple-discs 13, 13 and 20, 20.

Although the cam face 23c is on a driven member and the cam face 15c is on a driving member, the contacts of the balls with those faces during the slip-drive acceleration of the ring 25 can be largely rolling contacts. Slip contacts of the balls and of the rings 26, 27 with the nylon ring do not result in much wear or loss of power, because of the slippery character of the nylon, and because only a small amount of force is at any time exerted between the nylon ring and the balls.

The extension sleeve 10c and the driving member 15 secured thereon are well adapted for the mounting upon the latter of a protective rubber cap 34 as shown.

Return springs are not shown because in the case of a centrifugal clutch mounted upon the shaft of an electric motor the operation of the driven machine usually is stopped by turning off the motor's electric current and thus there is no need for otherwise terminating the effectiveness of the centrifugal force. The faces 23c and 15c of course converge outwardly at a large enough angle to avoid the presence of an " angle of repose" that would cause the balls to stay strongly wedged between those converging faces when the circuit is opened.

The invention has the advantages that are set out in the above statement of objects and is subject to modification without sacrifice of all of those advantages and without departure from the scope of the appended claims.

I claim:

1. In a centrifugal clutch assembly, the combination of a rotary input drive element, a rotary driving member coupled to said input drive element to be driven thereby, a rotatable driven member mounted for axial movement toward and away from said driving member and for relative rotation with respect to said input drive element, said driving and driven members presenting axially spaced apart, confronting annular cam faces which converge toward each other in radially outward direction and which define between them an annular cam space which is progressively narrower radially outward, a rotatable cam carrier mounted for relative rotation with respect to said input drive element, a plurality of circumferentially spaced cam members carried by said cam carrier in said cam space for engagement with said cam faces, said cam members being mounted on said cam carrier for centrifugal movement between said cam faces to force said driven member axially away from said driving member upon rotation of the cam carrier, a pair of axially spaced rotatable friction drive members which are separate from said driving and driven members and which are coupled to said input drive element to be driven thereby and which frictionally engage opposite sides of said cam carrier to rotate the latter, and means for maintaining said friction drive members continuously in frictional engagement with said cam carrier irrespective of the position of said cam members.

2. The clutch assembly of claim 1 wherein there are provided spring means acting between said driving member and one of said friction drive members and forcing said last mentioned friction drive member axially against said cam carrier.

3. The clutch assembly of claim 2 wherein there are provided adjustable means on said driving member and acting against said spring means for selectively adjusting the axial force exerted by said spring means against said last-mentioned friction drive member.

References Cited in the file of this patent

UNITED STATES PATENTS

| | | |
|---|---|---|
| 1,850,226 | Dickson | Mar. 22, 1932 |
| 1,889,291 | Pirinoli | Nov. 29, 1932 |
| 2,180,217 | Thomas | Nov. 14, 1939 |
| 2,306,730 | Holmes | Dec. 29, 1942 |
| 2,705,113 | Bonanno | Mar. 29, 1955 |
| 2,711,292 | Taggart et al. | June 21, 1955 |

FOREIGN PATENTS

| | | |
|---|---|---|
| 394,467 | Great Britain | June 29, 1933 |